Jan. 2, 1951 J. J. SCHUNCK 2,536,471
VERTICALLY RECIPROCATING SIFTING CHUTE
Filed Dec. 31, 1946 2 Sheets-Sheet 1
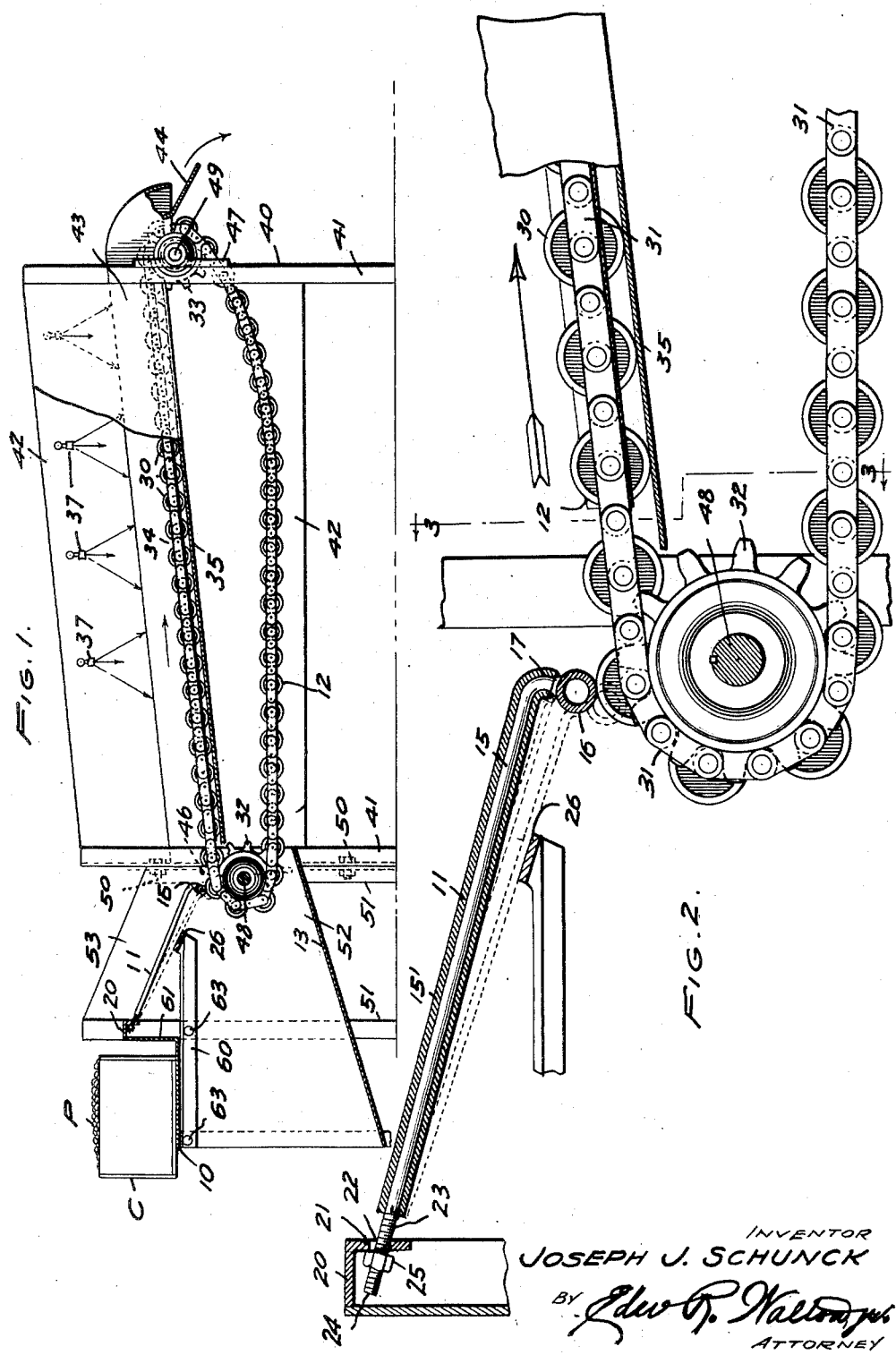
INVENTOR
JOSEPH J. SCHUNCK
BY
ATTORNEY Jan. 2, 1951  J. J. SCHUNCK  2,536,471
VERTICALLY RECIPROCATING SIFTING CHUTE
Filed Dec. 31, 1946  2 Sheets-Sheet 2

INVENTOR
JOSEPH J. SCHUNCK
BY Edw. P. Walton Jr.
ATTORNEY

Patented Jan. 2, 1951

2,536,471

UNITED STATES PATENT OFFICE 2,536,471

VERTICALLY RECIPROCATING SIFTING CHUTE

Joseph J. Schunck, Orlando, Fla., assignor to American Machinery Corporation, Orlando, Fla., a corporation of Florida Application December 31, 1946, Serial No. 719,523

5 Claims. (Cl. 209—257)

1

This invention relates to chutes for machines that process produce, such as fruits and vegetables, and more particularly to that type of chute that is adapted to remove the greater bulk of dirt, stems, leaves and like trash, that is collected with the produce, before the produce is subjected to the actual treating steps of the process.

In machines for handling produce, a typical chute construction comprises a dump board, which is a ledge upon which containers filled with the produce may be set, a slat dump, which is a downwardly inclined grating next to the dump board and upon which the produce is dumped, and a conveyor adjacent the lower end of the grating upon which the produce will roll from the grating and be conveyed to a treating machine, such as a washer or the like. When the produce is dumped onto the inclined grating, any trash, such as dirt, leaves, stems and the like, is supposed to be separated from the produce by dropping through the grating. Consequently, the produce is supposed to be relatively clean when it rolls onto the conveyor. The conveyor may partake of a variety of forms and may comprise a series of rotatably driven rollers or an endless conveyor in the form of a belt or comprising spaced slats or rollers.

A machine equipped with chutes of this type are more-or-less satisfactory when employed with relatively clean produce such as tree-grown fruits, but it is entirely unsatisfactory with respect to produce, such as potatoes and other earth-grown vegetables, which are rather dirty when collected. Even with the so-called clean produce the machine is not highly satisfactory due to the fact that stems, leaves and the like are not necessarily removed and, in the case of certain vegetables, such as cucumbers and tomatoes, which may carry a small amount of surface dirt, there has been very little cleaning or separating accomplished.

Having in mind the defects of the prior art, it is an object of this invention to provide an improved vibrating chute that is extremely simple and effective for removing and separating substantially all of the dirt and trash from produce before it is subjected to treatment and that is in association with a conveying means of a processing machine and in such manner that the chute will be agitated by the conveying means. It is contemplated that such apparatus may be incorporated as part of a treating machine or that it may comprise a unitary member in the form of an attachment that is adapted

2 for assembly with standard types of treating machines.

The foregoing objects and others ancillary thereto are preferably accomplished, according to a preferred embodiment of the invention, by forming the chute of a slatted grating and arranging it to be agitated or vibrated vertically in order to shake the dirt and trash from the produce and to cause the dirt and trash to gravitate through the grating immediately. Specifically, the grating is formed of a plurality of rods, bars, slats or the like that are arranged more-or-less longitudinally of the line of travel of the produce and have their upper ends adjustably and loosely pivotally mounted and their lower ends connected to a cross-member. The grating, as a unit, is shaken up and down and a cross-bar is mounted beneath the grating to limit its downward movement and to stop the movement suddenly or with a jolt so as to shake the dirt and trash from the produce and to cause it to gravitate between the members of the grating.

The grating is caused to shake or vibrate by having its lower connecting cross-bar positioned so that it rides upon the adjacent ends of a conveyor that comprises an endless member which is preferably formed of rollers but may comprise slats or other similar members that are spaced apart. By means of this arrangement, the lower end of the grating is raised by contact with one of the elements of the conveyor and then drops as the contacting element moves forwardly from beneath the grating. In order to provide freedom of movement of the upper end of the grating and adjustability relative to the adjacent end of the conveyor, the members forming the grating are inserted loosely through oversize apertures in a cross member of the the supporting frame, and a limited number of the grating members are threaded at their upper ends and have nuts threaded thereon to hold these members relative to the cross member.

As the direction of drive of the conveyor tends to pull the grating longitudinally, the nuts on the threaded members act as stops to hold the grating against this longitudinal pull and, by adjusting the nuts, the lower end of the grating may be adjusted relative to the conveyor. If desired, a series of spray nozzles may be positioned above the conveyor and may be connected with either a source of air, for blowing any remaining dirt from the produce and between the conveyor elements, or with a water supply for prewashing the produce. In some instances, as with cucumbers, this prewashing may be all the cleansing that is necessary. If desired, the slat dump grating, with or without a dump board, may be mounted on a separate frame that is adapted for attachment to any type of machine that employs a slatted, endless conveyor.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout, and in which:

Fig. 1 is a cross-sectional view taken on a vertical plane which extends longitudinally of the machine;

Fig. 2 is a cross-sectional view taken on line 2—2 of Fig. 3; and

Figure 3:
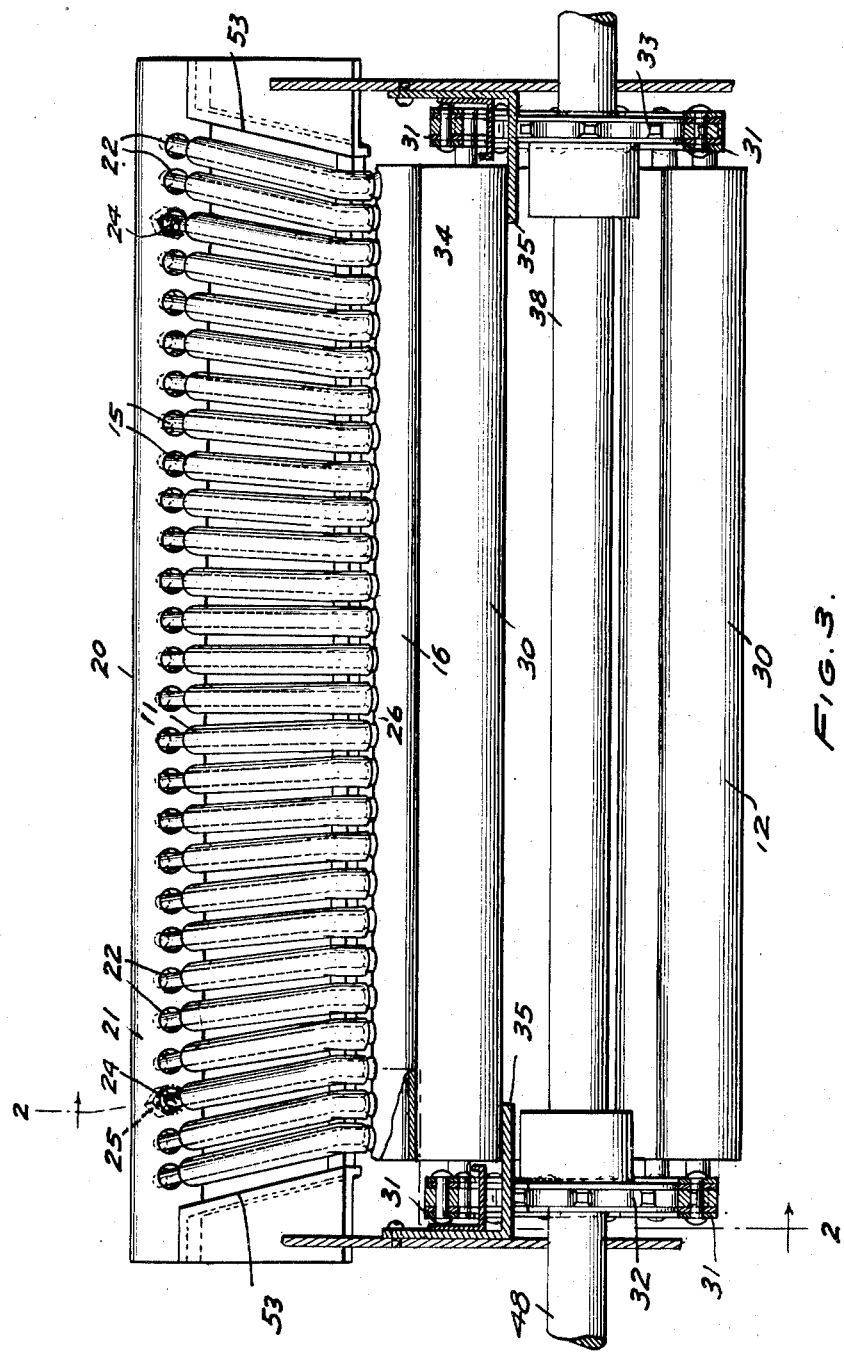
Fig. 3 is a cross-sectional view taken on line 3—3 of Fig. 2.

Referring to Fig. 1 of the drawings, the chute of the invention comprises an inclined grating 11 immediately between a dump board 10 and a conveyor 12, the lower end of the chute 11 resting upon the conveyor to be vibrated thereby. In operation, a container C filled with produce P may be set on the dump board 10 and then tilted to dump the produce P onto the chute 11. When the produce P is so dumped, it rolls and slides down the incline thereof and onto the conveyor 12, while the dirt, stems, twigs, leaves and other trash gravitate through spaced longitudinal slots or openings in the chute 11 onto an inclined collection trough 13, down which it may slide from beneath the machine.

As best shown in Figs. 2 and 3, the chute 11 is formed of a plurality of rods 15 that are surrounded by soft covers 15, such as rubber tubing, to protect the produce from abrasion or bruising. The rods 15 extend substantially longitudinally in the direction of movement of the articles that move over the chute but do angle outwardly slightly at their upper ends to provide a wider feed or dump area. The lower ends 17 of the rods 15 are fixed to an end member 16 which is to rest on the conveyor 12 and is preferably circular in cross section and may be formed by a section of tubing. In the preferred form, the rods have their lower ends 17 bent at right angles immediately before their juncture with the cross bar 16 so that the lower end of the chute 11 will be slightly above the plane of the conveyor 12. An end frame member 21 is connected to the other or upper ends 23 of the rods 15 and is provided with a plurality of aligned, spaced apertures 22, each of which is considerably larger than the diameters of the rods to loosely receive the upper end of one of the rods 15 and aids in the shaking vibratory movement of the chute. The upper ends 23 of the rods 15 are not connected to each other but are held together by the lower end member 16 and, consequently, they may be freely inserted in the apertures 22. Some of the rods 15, preferably at least one adjacent each side of the chute, are provided with threads 24 at their upper ends 23 and have nuts 25 threaded thereon to form adjustably-positioned stops relative to the supporting flange 21. By adjusting the nuts 25, the chute 11 may be adjusted either angularly or longitudinally of the machine to position end member 16 in parallelism with the conveyor rollers or flights 30 to insure even contact. A cross member 26 is fixedly disposed beneath the rods 15 to limit the lower angular position of the chute 11 and to form a shock bar.

In practice the lower end member 16 of the chute rests upon the end portion of the upper reach 34 of the conveyor 12 adjacent its sprocket 32 and the conveyor may comprise a plurality of transversely-positioned, parallelly-spaced members 30 that have their ends supported by endless chains 31, one on each side of the conveyor 12. The members 30 may be in the form of rollers, flights, slats or the like, but it is preferred that they comprise rollers that are journaled in the chains 31 so that they may rotate freely on rail 35. The chains 31 are run over sprockets 32 and 33 which are mounted on the opposite ends of the machine and one of which, preferably the sprocket 33, may be driven by a suitable source of power (not shown).

The nuts 25 may be adjusted so that the end member 16 of the chute 11 is properly positioned to ride on the end of the conveyor 12. More specifically, the end member 16 should be positioned so as to contact the rollers 30 as they are brought up and around the sprockets 32. Thus, each roller 30 will raise the end member 16 as it passes thereunder, after which the end member 16 will drop back behind the roller that has immediately passed thereunder and above or in front of the next succeeding roller 30. Therefore, as the conveyor 12 is driven, each of its bed-forming elements 30 will pass beneath the cross member 16 of the grating 11 to raise and lower the grating and thereby agitate or vibrate it in a vertical direction. When the grating 11 drops from each of the rollers 30, it is stopped abruptly in its fall by the shock bar 26. This shock action knocks the dirt and trash from the produce and also, taking advantage of gravity, jolts the refuse so that it passes through the grating 11 and falls to the discharge chute 13. This shock allows the entire chute to vibrate with a sliding or quivering motion due to the ends 23 of the rods 15 being loose in the openings 22.

Customarily, the produce is discharged at 44 by the conveyor 12 to a suitable treating machine, such as a washer, waxer, brusher or the like. In the present instance, however, and in order to remove all of the dirt, and possibly eliminate the necessity for an additional machine, a series of air or water spray nozzles 37 may be positioned above the bed of the conveyor 12.

The vibratory chute 11 may be incorporated as part of a complete machine, as shown in Fig. 1 or it may be provided as an attachment for assembly with any standard machine, as shown in Figs. 2 and 3. The latter structure is shown in Fig. 1 of the drawings. The machine 40 may be a standard type that comprises a supporting framework 41, side walls 42, guide plates 43 which define the sides of the treating bed 34, a delivery chute 44, brackets 46 and 47 for journaling shafts 48 and 49 upon which the sprockets 32 and 33 are mounted, the bed rails 35, the spray nozzles 37 and the conveyor 12. The vibratory slat dump attachment may be secured to the front end of the machine 40, as by bolts 50 and may comprise a framework 51 to which is attached the waste chute 13, the side walls 52, side plates 53 for defining the sides of the dump chute, the dump board 10, the shock bar 26, the top cross frame 20 and the slat dump or grating 11.

If desired, the slat dump 11 and its support may be provided as a separate assembly that comprises side frames 60 which may be joined at one end by the dump board 10 and at the other end by the shock bar 26 and provided, at the rear edge of the dump board 10, with an upstanding wall 61 to which may be attached the cross frame 20 and the slat dump or grating 11. This assembly may be removably secured in any suitable type of machine as by bolts 63. Any standard machine may be modified to include a vibratory slat dump by removing the rigid slat dump, if there is one, boring the series of apertures 22 in the upper cross frame 20 and inserting the free ends 23 of the grating rods 15 within the bored apertures.

In the operation of the present invention the operator may set a container C, filled with produce P, upon the dump board 10 and then tilt the container C against the cross frame 20 so as to spill the produce P onto the chute 11. As the conveyor 12 is advanced, each of its spaced bed-forming elements 30 will raise the end bar 16 of the chute 11 and, as each moves beyond the end member 16, the rods 15 of the chute 11, because of the loose connections at 22, drop until they strike the shock bar 26 with a sudden jolt.

When the produce P is dumped onto the chute 11, some of the dirt and trash that is accumulated with the produce becomes loosened and falls to or between the rods 15 of the chute 11. All of the trash is not removed at this time, however, as some of it cannot readily pass between the rods 15 and some of it is not loosened from the produce P. When the chute 11 is raised or thrown up, by the action of the conveyor elements, some of the adhering trash is shaken loose and then when the chute is dropped and stopped abruptly by the shock bar 26, the majority of the remainder of the trash is knocked from the produce. In addition, the loose trash which has not fallen between the rods 15, is shaken through the grating by the jolt that is created by striking the shock bar 26.

Although certain specific embodiments of the invention have been shown and described, it is obvious that many modifications thereof are possible. The invention, therefore, is not to be restricted except insofar as is necessitated by the prior art and by the spirit of the appended claims.

That which is claimed as new is:

1. A chute structure of the character described, comprising, in combination, framework including side frames, a slat chute having upper and lower cross frame members and spaced slat members extending between and supported at their opposite ends by said cross frame members, said upper cross frame member being hingedly mounted on and between said side frames, and a jolt bar mounted on and between said side frames at a level lower than said hingedly mounted slat chute upper cross frame member and forwardly thereof a distance less than the length of the slat chute, said slat chute resting loosely in inclined position on said jolt bar, the lower end of said slat chute being free and its lower cross frame member being accessible for swingingly lifting the slat chute off of said jolt bar and dropping the slat chute down on the jolt bar.

2. A chute structure as set forth in claim 1 and in which the slat members have their lower end portions adjacent the slat chute lower cross frame member bent downwardly at an angle to their main body portions.

3. In produce cleaning apparatus of the character described, in combination, an endless chain cleaning conveyor having an endless succession of exteriorly extending protuberances, framework including side frames and a cross jolt bar, a slat chute hingedly mounted at its upper end on and between said side frames and resting loosely intermediate its ends in downwardly inclined position on said jolt bar, said slat chute having across its lower end a cross member positioned in the path of movement of said exteriorly extending protuberances of said cleaning conveyor, whereby each of said protuberances as they pass in succession past said slat chute cross member lifts the slat chute from said jolt bar and then drops the slat chute down on the jolt bar.

4. In produce cleaning apparatus as set forth in claim 3 and in which slat members extend longitudinally of the chute and have their end portions adjacent the cross member at the lower end of the chute bent downwardly at an angle to their main or body portions and the main or body portions of said slat members are elevated above the adjacent part of the cleaning conveyor.

5. In produce cleaning apparatus of the character described, in combination, an endless chain cleaning conveyor having an endless succession of live cross rollers, framework including side frames and a cross jolt bar, a slat chute hingedly mounted at its upper end on and between said side frames and resting loosely intermediate its ends in downwardly inclined position on said jolt bar, said slat chute having across its lower end a tubular cross member positioned in the path of movement of said conveyor rollers, said rollers as they pass in succession past said slat chute lower cross member successively engaging said cross member and alternately lifting the slat chute off of said jolt bar and dropping the slat chute down on the jolt bar.

JOSEPH J. SCHUNCK.

REFERENCES CITED

The following references are of record in the file of this patent:

UNITED STATES PATENTS

| Number | Name | Date |
|---|---|---|
| 3,852 | Chandler et al. | Dec. 7, 1844 |
| 15,785 | Smith | Sept. 23, 1856 |
| 206,544 | Davis et al. | July 30, 1878 |
| 595,523 | Cherry et al. | Dec. 14, 1897 |
| 786,291 | Hubbell | Apr. 4, 1905 |
| 947,742 | Rohrbach | Jan. 25, 1910 |
| 1,655,871 | Lum | Jan. 10, 1928 |
| 1,708,137 | Helenbolt | Apr. 9, 1929 |
| 1,811,991 | Bates | June 30, 1931 |
| 1,844,091 | Hill | Feb. 9, 1932 |
| 2,316,159 | Evett | Apr. 13, 1943 |